Dec. 10, 1968   J. A. URICH   3,415,542
VEHICLE COUPLING MEANS
Filed Dec. 27, 1966   2 Sheets-Sheet 1

Dec. 10, 1968   J. A. URICH   3,415,542
VEHICLE COUPLING MEANS
Filed Dec. 27, 1966
2 Sheets-Sheet 2
FIG.4.
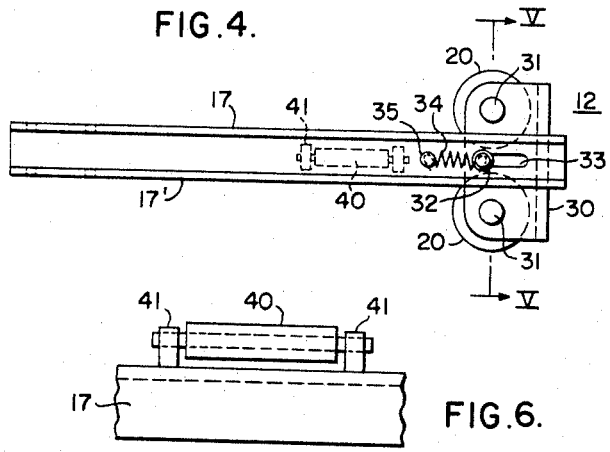
FIG.5.
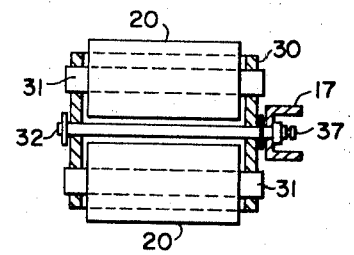
FIG.6.
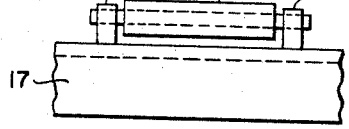
FIG.7.
FIG.8.
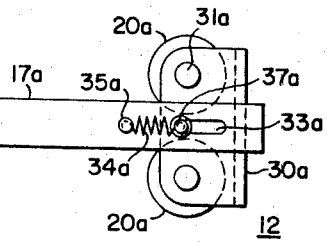
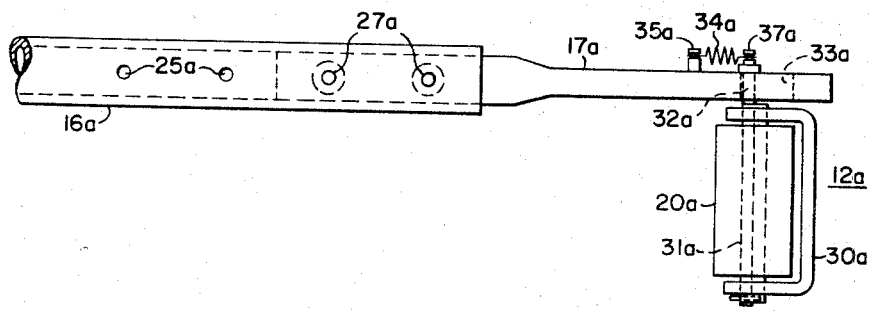
FIG.9.
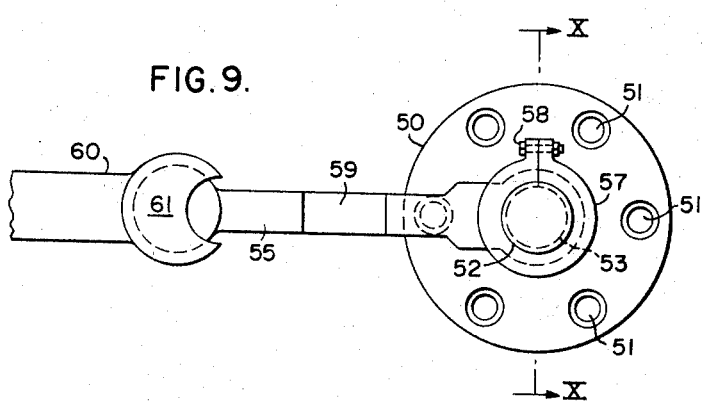
FIG.10.
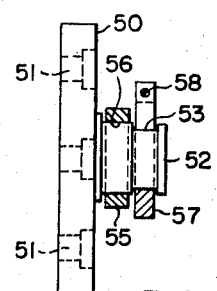

United States Patent Office 3,415,542
Patented Dec. 10, 1968

3,415,542
VEHICLE COUPLING MEANS
Joseph A. Urich, 5036 Northlawn Drive,
Murrysville, Pa. 15668
Filed Dec. 27, 1966, Ser. No. 604,735
3 Claims. (Cl. 280—460)

ABSTRACT OF THE DISCLOSURE

A coupling apparatus for coupling together at least two mobile units for close coordination of movement comprising a pair of arm assemblies pivotally mounted on a first mobile unit and arranged to extend in a generally parallel relationship with the first mobile unit. The apparatus includes further an adapter plate or a roller assembly arranged to engage the wheels of a second mobile unit at a location substantially diametrically opposed to a point of contact between the first mobile unit and the wheels of the second mobile unit. Each arm assembly includes further a displaceable arm portion for permitting displacement of the adapter plate or roller assembly when it is desired to clear the wheels of the second mobile unit, for example, when the second mobile unit is coupled or uncoupled from the first mobile unit.

Disclosure

The present invention relates generally to a structure for temporarily coupling together mobile units requiring close coordination, and particularly to an apparatus for coupling a self-propelled paving machine or paver to a load discharging feeder vehicle such as an asphalt carrying dump truck though the invention is not limited thereto.

In general practice, self-propelled paving machines engage the rear of the feeder vehicle, i.e., the dump truck, and push it along the surface to be paved as the paving material is transferred from the truck to a hopper forming part of the paving machine. In order to obtain coordination of movement between the truck and paving machine, the brakes of the truck are partially set so as to apply a braking force against the paving machine which prevents the truck from moving away from the paving machine. Should the truck and machine separate, the paving material spills onto the paving surface between the machine and truck so that the paving process must then be halted while the spilled material is removed from the surface. Further, the paving machine, while at a standstill, tends to settle into the soft paving material because of its substantial weight so that when the paving process is resumed, a depression is left in the paved surface.

While this known method (using the vehicle brakes) of coordinating the machine and feeding truck has the advantage of being simple and of permitting a fairly rapid change of feeder vehicles, a factor quite important in maintaining a high degree of efficiency in the operation of road building equipment, this advantage is largely offset by certain drawbacks resulting from the simultaneous application of a driving force and a braking force, namely, drawbacks such as (a) excessive wear and tear on the brakes of the driven unit (feeder vehicle), and on the drive gear and traction parts of the driving unit (paver); (b) lower efficiency of operation of the driving unit due to the greater power requirement; and (c) the formation of waves and humps in the paving due to heavy initial vibration and jerky motion of the paver upon starts, such vibration and jerky motion being due to the higher initial torque required to overcome greatly increased friction as a result of braking forces being applied.

It should be noted further that the trucks employed as the feeding vehicles arrive at the paving location with their brakes already heated from use along their route of travel, the use of the brakes depending of course on the type of terrain travelled by the trucks. If the brakes of the trucks are already heated from normal or abnormal use, further use of the brakes for the paving operation can easily result in locked wheels with further disruption of the paving operation.

Accordingly, a principal object of the present invention is to provide simple and relatively inexpensive means for permitting mobile units to be readily coupled together for closely coordinated movement without the disadvantages discussed above.

Another object of the invention is to provide a coupling apparatus for coupling two vehicles together so that one of the vehicles may push the other and remain in fixed close coordination without the use of the brakes of the vehicle being pushed.

A more particular object of the invention is to provide vehicle coupling apparatus having pivotal arm assemblies for detachably coupling together at least two vehicles so as to establish a force transmitting connection between them effective at least in a direction opposite to the direction of travel of the vehicles.

Briefly, these and other objects and advantages of the invention are accomplished by a pair of elongated arm assemblies pivotally connected to a paving machine adjacent one of their ends. Adjacent the other end of each assembly, in one embodiment, is provided a roller means arranged to tangentially engage the periphery of at least two of the wheels of a feeder vehicle, such as a dump truck, at a location on the wheels substantially diametrically opposed to a point of thrust engagement of the paving machine with the wheels of the truck. To engage and disengage the roller means with the truck wheels, the roller means is attached to a movable arm portion forming part of the arm assembly. The movable arm portion conveniently allows the roller means to be moved out of the way of the wheels when the truck and paving machine are coupled and uncoupled.

The invention will become more apparent upon consideration of the following detailed description along with the accompanying drawings, in which:

FIG. 4 is a side elevation view of a roller assembly embodiment forming part of the coupling means of the present invention;

FIG. 5 is an end elevation view of the roller assembly shown in FIG. 4 with portions thereof shown in section;

FIG. 6 is a partial top plan view of an additional roller assembly affixed to the arm assembly of the invention;

FIG. 7 is a partial side elevation of a second embodiment of an arm assembly of the invention;

FIG. 8 is a partial bottom plan view of the embodiment depicted in FIG. 7.

FIG. 9 is a side elevation view of a wheel attachment plate embodiment of the invention; and FIG. 10 is an end elevation and partial cross section view of the embodiment depicted in FIG. 9 taken along line X—X.

Figure 1:
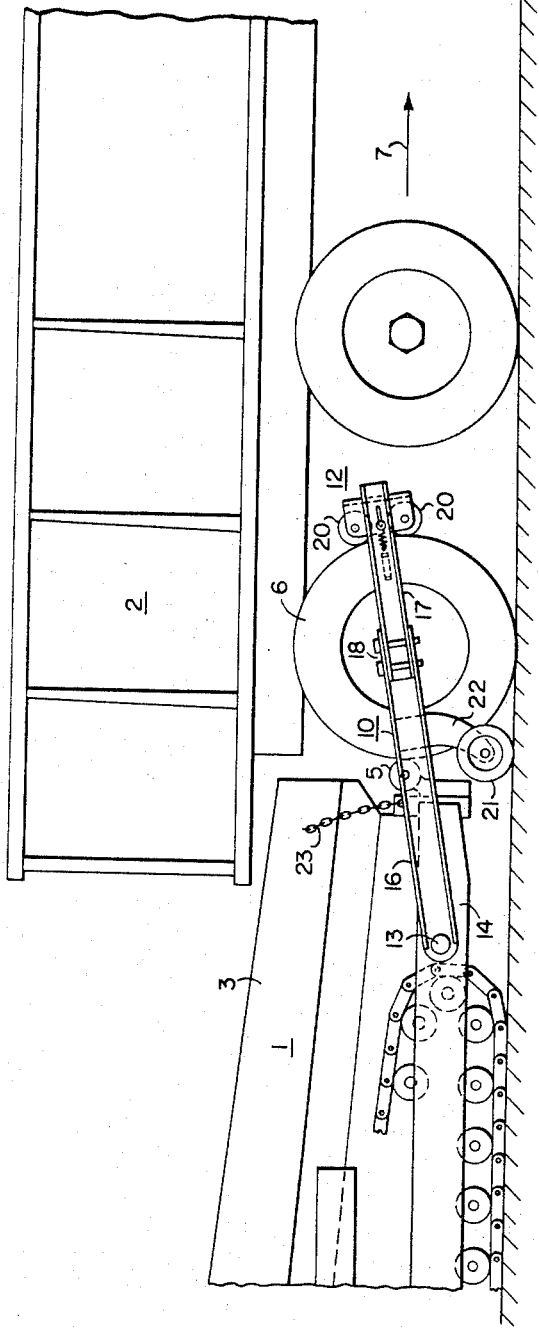
FIGURE 1 is a diagrammatic and partial side elevation view showing generally the normal operating position of a paving machine and feeder truck coupled together with a coupling apparatus constructed in accordance with the principles of the present invention.

Specifically, there is shown in FIG. 1 the forward portion of a paving machine or paver 1 and the rearward portion of a feeder vehicle or truck 2 disposed in a cargo transfer position relative to a hopper 3 of the paving machine. The paving machine is provided with a push roller or rollers 5 for frictionally engaging the rear tires 6 of the truck to impart a forward thrust thereto when the paver is moving in the direction indicated by the arrow 7. The paver and truck are further shown coupled together by the coupling apparatus of the invention presently to be described.

In one embodiment of the invention, the coupling apparatus comprises a pair of arm assemblies 10 having a pair of roller assemblies 12 attached thereto adjacent one end thereof as best seen in FIGS. 1, 4 and 8. The pair of arm assemblies are substantially identical in construction; thus, only one is shown and described herein.

In FIG. 1, the novel arm assembly 10 is shown pivotally connected at 13 to a rocker beam member 14 forming a part of the paver 1. The arm assembly comprises two supporting arm members 16 and 17 hinged together at location 18 to provide expedient coupling and uncoupling of the paver and truck in a manner to be explained hereinafter.

Pivotally mounted on the free end of arm member 17 is the roller assembly 12 including a pair of rollers 20 peripherally engaging the truck tire 6 at points generally diametrically opposed to the point of engagement between the push rollers 5 and the tire 6. Support gear comprising a wheel 21, which may have a solid rubber tire thereon, and a strut member 22 is secured to the arm assembly 10, preferably to the supporting arm member 16 thereof. In addition to the support gear, or in lieu thereof, there may be provided hanger means for lifting the arm assembly 10 when it is desired, for example, to have the wheel 21 clear of the ground. In FIG. 1 the hanger means is shown as a simple chain 23 connected to the side of the hopper 3 and to the arm member 16. The hanger means could take the form of a hydraulic mechanism attached between the hopper and arm 16, or some other type of means suitable for lifting and lowering the arm assembly 10.

Figure 2:
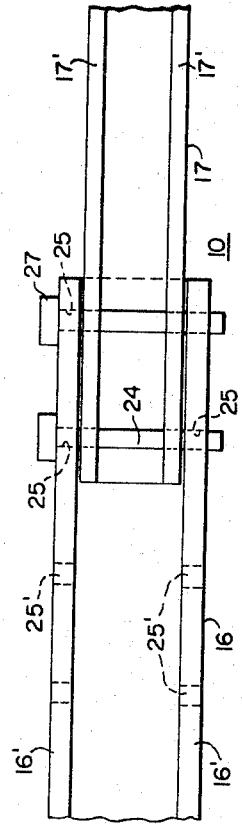
FIG. 2 is a partial side elevation view of one embodiment of an arm assembly of the invention.
Figure 3:
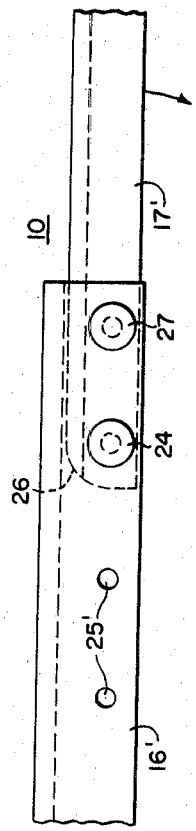
FIG. 3 is a top plan view of the embodiment shown in FIG. 2.

Referring more particularly to FIGS. 2 and 3, the arm members 16 and 17 may each comprise a channel stock of steel or aluminum or any other suitable material having flange portions 16' and 17' respectively and being of an adequate strength and, preferably, relatively light of weight. The width of the arm member 17 is shown slightly less than the spacing between the flange portions 16' of the channel stock member 16, as shown in FIG. 2. This permits an end portion of the channel member 17 to be freely fitted between said flanges of the channel member 16 and to be pivotally connected to the latter by means of a hinge pin 24 extending through openings 25 formed in the flanges of both channel members. In order to allow the channel member 17 to swing about the pin 24, the edge portion thereof, indicated at 26 in FIG. 3 is rounded off on a radius permitting pivotal movement of the channel member 17 about the hinge pin 24 in the clockwise direction, as seen in FIG. 3, which corresponds to the direction out of the paper plane when viewing FIGS. 1 and 2, the purpose of the pivotal movement to be explained hereinafter. A lock pin 27, which loosely fits through the openings 25, is provided to lock the arm member 17 against pivotal movement when inserted in the respective openings 25, and to release it for such movement when withdrawn from the openings. As shown in FIGS. 2 and 3, there are additional openings 25' formed in the flanges 16' of channel member 16 to allow longitudinal adjustment of the channel member 17 relative to the channel member 16, thereby to vary the overall length of the arm assembly 10. The openings 25 and 25' are, of course, spaced apart equally to permit such adjustment.

Referring now to FIGS. 4 and 5, the roller assembly 12 comprises a U-shaped frame 30 (see FIG. 8) rotatably supporting the pair of rollers 20 mounted on shafts or axles 31, the frame 30 in turn being disposed on a rod or axle 32 which extends through an elongated slot 33 provided in the arm member 17, and is slidably retained therein in any suitable manner. A tension spring 34 is attached at one end thereof to a pin 35 carried by the arm 17, and at the other end to a pin 37 (see FIG. 4) carried by the rod 32. This biases the frame 30 toward the left, as seen in FIGS. 1 and 4.

The coupling arm member 17 may be provided with a lateral guide roller 40 journalled in bearing members 41 formed on or secured to the arm member 17, as shown in FIG. 6. The roller and bearing members are disposed on the arm member 17 facing the truck 2 when the arm assembly is locked in place. The roller 40 is thus positioned to engage the side of the tire 6.

It is understood, of course, that certain modifications may be made without departing from the broad scope of the invention. Thus, for example, an additional rod parallel to rod 32 and extending through the slot 33 may be provided for stronger support of the frame 30. The frame 30 may be rigidly secured, e.g., welded, to the arm member 17, with elongated slots, such as slot 33, being provided, if desired, in the side wall members of the frame 30 to slidably support the roller axles 31 therein. Furthermore, if movement of the mobile units 1 and 2 is expected to be exclusively along rectilinear paths such that progression of the wheels on one side of the vehicle 1 relative to those on the other side thereof would not occur, it may not be necessary to elongate the opening or openings for receiving the rod 32 or axles 31, respectively, whichever the case may be.

In operating the coupling apparatus, the supported arm members 17 on both sides of the paver 1 are swung outwardly about their hinge pins 24 preparatory to the feeder vehicle 2 being maneuvered into position to engage the push rollers 5 of the paver as seen in FIG. 1. With the vehicle in the proper position to feed its cargo to the hopper 3 of the paver, the arm members 17 are returned to their normal positions, and the lock pins 27 are inserted into the respective openings 25 to lock the arm members 17 against further movement relative to the associated arm members 16. The rollers 40 will now cooperate with the sidewalls of the tires 6, and the rollers 20 will tangentially engage the peripheries of the tires, thereby to inhibit any tendency of the vehicle 2 to separate itself from the paver 1. When such separation is desired, removal of the lock pins 27 and outward pivotal movement of the arm members 17 will free the vehicle 2, with the coupling linkage ready for re-engagement with the next feeder vehicle to be moved into feeding position.

It is to be noted that with the coupling linkage locked in its effective coupling position, any acceleration as well as deceleration of the vehicle 2 takes place solely under the control of the driving unit, namely, the paver 1, and the brakes of the vehicle are fully disengaged as long as the vehicle is connected to the paver. This, it will be appreciated, eliminates the disadvantages, as initially described herein, inherent in the simultaneous application of a driving force and an opposing retarding force.

A second embodiment of the invention is illustrated in FIGS. 7 and 8 wherein the same reference numerals are used to designate parts similar to corresponding parts shown in FIGS. 1 to 4, however, with a suffix "a" combined therewith.

The second embodiment distinguishes from the linkage of the first-described embodiment primarily by utilizing arm members 16a and 17a each having a circular cross-section and being of tubular construction at least along sections thereof constituting the end portions of the two members 16a and 17a which are joined together; and by omitting the hinge type connections between the arms.

As shown in FIGS. 7 and 8, the arm member 17a has its left-hand portion telescopically inserted in the tubular arm member 16a, and rigidly connected thereto by means of two lock pins 27a, though one may suffice. The right-hand portion of arm member 17a is flattened in order to facilitate the mounting thereon of the roller assembly 12a, the latter being of similar design and being connected to the arm 17a in the same manner as described in connection with the embodiment of FIGS. 1 to 4, a detailed description thereof therefore being deemed unnecessary.

The operation of the coupling linkage illustrated in FIGS. 7 and 8 is as follows: preparatory to the coupling of a vehicle to, or uncoupling of a vehicle from, the paver 1, the supported arm members 17a are not swung outwardly, as is done with the embodiment of FIGS. 1–4; instead, the arm members 17a are rotated about their longitudinal axes, after removal of the lock pins 27a, until the roller assemblies 12a are out of the path of movement of the wheels and tires 6 of the feeder vehicle. Conversely, in order to establish coupling relationship between the vehicle and paver, the members 17a are returned to their original positions, again by rotation about their longitudinal axes, to place the rollers 20 into their above-mentioned cooperative positions relative to the vehicle tires 6, whereupon the lock pins 27a are reinserted into their associated openings 25a extending through the walls of the tubular members 16a and 17a and aligned with each other.

Although not shown in FIGS. 7 and 8, guide roller means, such as indicated at 40 in FIG. 4 and as shown in greater detail in FIG. 6, may, of course, also be provided on coupling arm assemblies such as illustrated in FIGS. 7 and 8.

The rollers 20 or 20a, and the rollers 40 may be made of any suitable material, metallic or nonmetallic.

A third embodiment of the invention is illustrated in FIGS. 9 and 10, wherein numeral 50 designates an adapter plate having a number of holes 51 formed therein for permitting the plate to be secured to the rear wheel 6 of a feeder vehicle 2 so as to be concentric therewith. Means for securing the adapter plate to the vehicle wheel may comprise bolts extending through the holes 51, and nuts threaded onto said bolts (not shown); or the plate 50 may be welded to the wheel of the vehicle. Formed on the adapter plate is a cylindrical extension 52 projecting axially from the plate and having a peripheral groove 53 formed therein as best seen in FIG. 10.

An arm member 55 having in one end thereof an opening 56 of a diameter slightly larger than the diameter of the cylindrical extension 52 is loosely fitted over the latter and is held in place thereon by means of a resilient retainer ring 57 of open construction, which ring is lodged in the peripheral groove 53 and has its free ends clamped together in any suitable manner, such as by a bolt-and-nut fastener as indicated at 58 or other suitable clamp means which would allow for a particularly quick and convenient removal of the retainer ring 57, or the like. The other end of the arm member 55, which may be laterally offset from the plane of the first-mentioned end portion, as indicated at 59, to provide adequate spacing thereof from the tire of the feeder vehicle, is connected to another arm member 60 through a ball or other suitable joint 61, permitting limited universal relative movement between arm members 55 and 60. The arm member 60 may be pivotally connected to the paver 1 directly, as is the arm member 16 (FIGS. 1–4), or it may be telescoped into, and fastened to, a supporting arm member such as arm member 16a shown in FIGS. 7 and 8, in which case replacing the supported arm member 17a.

An arrangement as just described with reference to FIGS. 9 and 10 is, of course, provided for each side of the mobile units 1 and 2, and coupling or uncoupling of the two units is effected simply by slipping the ring-like end 56 of arm member 55 on or off, respectively, the cylindrical extension 52 after removal of the retainer ring 57.

It should now be apparent from the foregoing description that a novel coupling apparatus has been disclosed which provides quick and easy coupling of two vehicles together, and insures that they remain together during the operation thereof. This is accomplished by simple and inexpensive structure such as channel or tubular arm members having hinged or rotating portions, respectively, that allow wheel engaging means to swing out and away from a feeder vehicle when it is desired to maneuver the vehicle into and out of engaging cooperation with a driving vehicle such as a paving machine. The arm members are held in rigid, operating position by a simple means, namely, a pin means placed to extend through the mutually engaging ends of the arm members in locking manner. When it is desired to uncouple the vehicles, the locking pin is simply removed to allow rotating or swing out displacement of the wheel engaging means.

Though the invention has been described with a certain degree of particularity, it is to be understood that modifications thereof may be made without departing from the spirit and scope of the invention.

What is claimed is:

1. A coupling apparatus for coupling together at least two vehicles requiring close coordination of movement, the coupling apparatus comprising
    at least one arm assembly having at least two arm members coupled together in such a manner that one arm member can be displaced relative to the other,
    one of said arm members having means adjacent one end thereof for pivotally coupling to a first vehicle,
    the other of said arm members having means adjacent one end thereof for engaging at least one wheel of a second vehicle,
    said arm members being made of channel stock having flange portions,
    the channel stock of one arm member having a width dimension less than that of the channel stock of the other arm member,
    the wider of the two members disposed over the narrower of the two members adjacent mutually engaging end portions thereof,
    at least two holes provided in the flange portions of said channel stock in the area of the mutually engaging portions,
    removable pin means for placement in said holes for locking the two arm members in substantially rigid axial alignment and for pivotally connecting the arm members together when one of said pin means is removed.

2. A coupling apparatus for coupling together at least two vehicles requiring close coordination of movement, at least one of said vehicles having rear tires while the other of said vehicles has roller means for engaging the outer peripheral surface of at least one of said tires, the coupling apparatus comprising
    at least one arm assembly having one end pivotally attached to said vehicle having the roller means,
    a roller assembly attached to the other end of said arm assembly,
    said roller assembly being spaced from the roller means on the first vehicle a distance substantially equal to the outside diameter of said tire, and
    means for supporting the arm assembly in a manner permitting said roller assembly to engage the outer peripheral surface of said tire at a location substantially diametrically opposed to that of the roller means,
    said arm structure and roller assembly being effective to maintain the distance between two vehicles constant when one vehicle is employed to move the other.

3. The apparatus described in claim 2 in which the arm assembly comprises at least two arm members made of tubular stock, the tubular stock of one arm member having a diameter less than that of the other arm member,
portions of the two arm members disposed in telescoping relation,
aligned openings provided in the telescoping portions, and
removable pin means for disposal in said openings for locking the arm members in substantially rigid axial alignment.

References Cited

UNITED STATES PATENTS

| | | | |
|---|---|---|---|
| 3,138,392 | 6/1964 | Holland | 280—460 X |
| 3,175,845 | 3/1965 | McClive | 280—460 |
| 3,232,586 | 2/1966 | McClive | 280—460 X |
| 3,275,342 | 9/1966 | Layton | 280—460 |
| 3,279,824 | 10/1966 | Brisbin et al. | 280—460 |
| 3,304,101 | 2/1967 | Layton | 280—460 |

LEO FRIAGLIA, *Primary Examiner.*

U.S. Cl. X.R.

280—503; 94—44

UNITED STATES PATENT OFFICE
CERTIFICATE OF CORRECTION

Patent No. 3,415,542                      December 10, 1968

Joseph A. Urick

It is certified that error appears in the above identified patent and that said Letters Patent are hereby corrected as shown below:

In the heading to the drawing, line 1, "J.A.URICH", each occurrence, should read -- J.A.URICK --. In the heading to the printed specification, line 3, "Joseph A. Urich" should read -- Joseph A. Urick --.

Signed and sealed this 17th day of March 1970.

(SEAL)

Attest:

Edward M. Fletcher, Jr.                    WILLIAM E. SCHUYLER, JR.

Attesting Officer                              Commissioner of Patents